(12) United States Patent
Becker et al.

(10) Patent No.: US 7,453,220 B2
(45) Date of Patent: Nov. 18, 2008

(54) DRIVE AND BRAKE

(75) Inventors: Günter Becker, Ostringen (DE); Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 0 days.

(21) Appl. No.: 10/593,433

(22) PCT Filed: Jan. 26, 2005

(86) PCT No.: PCT/EP2005/000735

§ 371 (c)(1),
(2), (4) Date: Sep. 18, 2006

(87) PCT Pub. No.: WO2005/096488

PCT Pub. Date: Oct. 13, 2005

(65) Prior Publication Data

US 2007/0273315 A1    Nov. 29, 2007

(30) Foreign Application Priority Data

Mar. 16, 2004  (DE) ................ 10 2004 013 033

(51) Int. Cl.
*H02P 3/00* (2006.01)
(52) U.S. Cl. ................ 318/362; 318/375; 318/757
(58) Field of Classification Search ........ 318/599, 318/811, 362, 375, 757
See application file for complete search history.

(56) References Cited

U.S. PATENT DOCUMENTS

| 4,090,117 | A  |   | 5/1978 | Sasamoto et al. |
| 5,892,341 | A  | * | 4/1999 | Chmiel ................ 318/362 |
| 6,031,738 | A  | * | 2/2000 | Lipo et al. ............ 363/37 |
| 6,291,952 | B1 | * | 9/2001 | Roth-Stielow et al. ...... 318/375 |
| 6,373,210 | B2 | * | 4/2002 | Roth-Stielow et al. ...... 318/380 |
| 6,919,705 | B2 |   | 7/2005 | Donat |

FOREIGN PATENT DOCUMENTS

| DE | 36 13 294 | 10/1987 |
| DE | 102 06 107 | 9/2002 |
| DE | 102 07 834 | 9/2002 |
| DE | 101 46 896 | 5/2003 |
| DE | 10 2004 013 033 | 7/2005 |
| EP | 1 162 726 | 12/2001 |
| GB | 1 390 432 | 4/1975 |
| JP | 8-157014 | 6/1996 |
| JP | 2000-38265 | 2/2000 |

* cited by examiner

*Primary Examiner*—Rina I Duda
(74) *Attorney, Agent, or Firm*—Kenyon & Kenyon LLP

(57) ABSTRACT

A drive, including at least a brake and an electromotor, is connected to an output stage with the aid of supply lines, the brake being supplied from a brake control, the brake control being connected to the supply lines for its supply, via capacitors.

25 Claims, 2 Drawing Sheets

DRIVE AND BRAKE

FIELD OF THE INVENTION

The present invention relates to a drive and brake.

BACKGROUND INFORMATION

German Published Patent Application No. 36 13 294 describes an electromagnetically actuable brake for a motor. The brake is operated by a unipolar voltage. Such DC voltage brakes are used in particular with drives that include electromotors.

German Published Patent Application No. 101 46 896 describes a drive system that includes a brake and an electromotor, which is supplied with the aid of an output stage.

U.S. Pat. No. 4,090,117 describes a single-phase capacitor motor having a brake. The coil of the brake configured as power-off brake is excited by an alternating current, which is taken directly from the supply lines of the motor.

Converters include at least one output stage and control electronics, which operate according to a pulse-width modulation method.

SUMMARY

Example embodiments of the present invention may provide for increasing the safety in industrial drives.

Features of example embodiments of the present invention include that the drive includes at least a brake and an electromotor, which is connected to an output stage with the aid of supply lines. The brake is supplied from a brake control. For its supply, the brake control is connected to the supply lines with the aid of capacitors.

The supply of the brake control may be a function of the AC voltages of the supply lines. As a result, the method of functioning of the output stage, i.e., in particular also the method of functioning of a rectifier, inverter or power converter including the output stage, may be able to be linked to the method of functioning of the brake. For example, this makes it possible to realize a safety brake which causes the brake to be activated in the event of faults in the output stage or in the mentioned devices.

As a result, the drive may be able to be braked should a fault occur. This also applies, in particular, to a voltage failure such as a power failure, for example. The capacitors and the brake control as well as the brake may be dimensioned in a manner that is appropriate for a response to the occurrence of the mentioned faults and additional faults.

The drive according to example embodiments of the present invention thus includes at least a brake and an electromotor, which is fed by an alternating current by an output stage via supply lines, the brake being supplied from a brake control which, via at least one capacitor, is connected to at least one of the supply lines and supplied therefrom.

The output stage may be able to be operated in a pulse-width modulated manner. The motor may not only be able to be supplied but also controlled, and may even be regulated if feedback of sensor signals or other electro-technical variables takes place.

The brake may be activated in response to long-lasting occurrences of DC voltages or zero voltages on the supply lines, i.e., brake torque is transmitted to the rotor shaft of the motor or to a shaft connected to the rotor shaft. For example, the brake is activated, i.e., transmits brake torque to the rotor shaft of the motor or to a shaft connected to the rotor shaft, if a critical minimum frequency of the respective time characteristics of the potentials of the supply lines is undershot. High reliability acting according to physical laws may be achievable. When the brake control is not supplied, the current flowing through the solenoid of the brake drops, and a spring force acting counter to the magnetic force is able to press a brake lining against a brake surface.

Instead of undershooting of a frequency, the brake is activated also when critical RMS values of the potentials of the supply lines are undershot, i.e., brake torque is transmitted to the rotor shaft of the motor or to a shaft connected to the rotor shaft. It may be provided that reliable deactivation is provided in the event of this type of fault as well.

The brake may also include a brake coil having a one-part or two-part arrangement. It may be provided that a cost-effective brake is able to be provided with the one-piece arrangement, and that it is possible to provide a brake coil which is able to be activated very rapidly in the case of the two-part brake coil. To this end, a brake control is to be developed which acts according to that described, for example, in German Published Patent Application No. 36 13 294, but is supplied from the supply lines with the aid of capacitors.

Feature of the brake according to example embodiments of the present invention are that it is actuable electromagnetically, brake for an electromotor, which is connected to an end stage, in particular of a converter, an inverter or a similar converter, via supply lines. The brake is supplied from a brake control, the brake control being connected to the supply lines for its supply, via at least one capacitor.

An aspect of the brake is that it is an electromagnetically actuable brake and the actuation therefore requires an electrical supply. When this supply fails, the brake is activated and the mechanically coupled electromotor is braked or stopped. The brake may be released only when an electrical supply is available. This increases the safety of the drive in emergencies or in the case of faults such as a power failure, etc.

Further aspects and features of example embodiments of the present invention are described in more detail below with reference to the appended Figures.

LIST OF REFERENCE NUMERALS 1 output stage, three-phased
2 motor
3 brake
4 brake control
C1 capacitor
C2 capacitor
C3 capacitor

DETAILED DESCRIPTION

Figure 1:
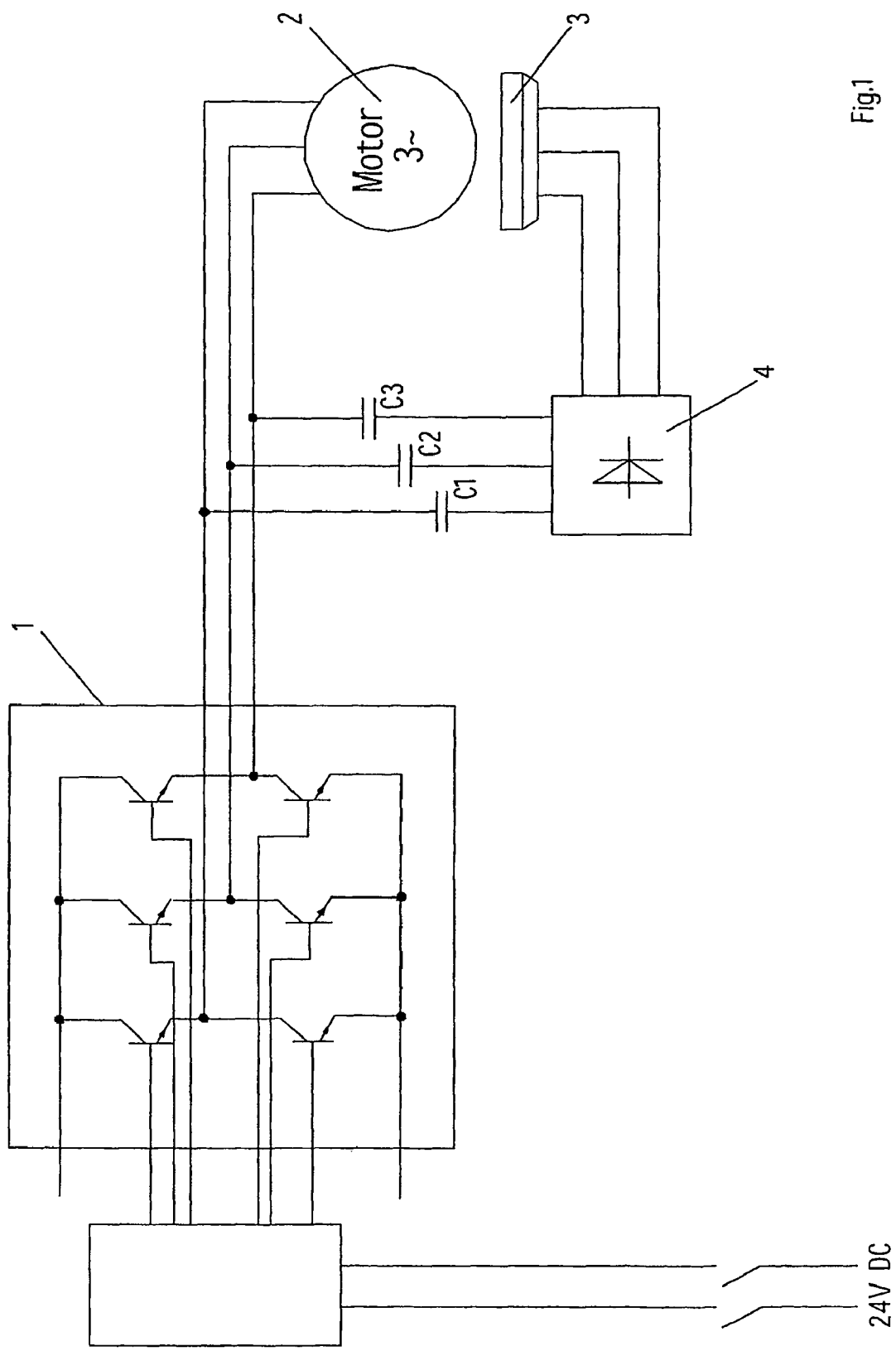
FIG. 1 illustrates a drive according to an example embodiment of the present invention.

FIG. 1 illustrates a drive according to an example embodiment of the present invention. It includes at least one output stage 1 of a converter, a brake 3 having an associated brake control 4, and a motor 2 on whose shaft—e.g., a rotor shaft or on a shaft connected thereto—the brake transmits brake torque when it has been activated, i.e., has not been disengaged. The output stage is triggered by control electronics supplied with a 24 V DC voltage.

The converter has an intermediate direct current link from which the switches of output stage 1 are supplied. The switches of the output stage are triggered using pulse-width modulation methods, such that the motor is supplied with a three-phase pulse-width modulated voltage. To this end, the converter at all times supplies at the output of its output stage a three-phase voltage indicator value, i.e., three output potential values that are applied at the three supply lines to the motor. To generate the values, the switches of the output stage establish a brief connection of different lengths to the different potentials of the so-called intermediate direct current link supplying the output stage, for each pulse-width modulation period, connected or separately. The desired potential value is generated as time average across a pulse-width modulation period.

The output stage is provided with safe deactivation. The safety is arranged such that it is no longer possible to generate a rotating field once the control electronics of the converter have been turned off, so that no rotation of the rotor, acting from the direction of the converter, is able to be forced. In this manner, the output stage and the power stage are able to be deactivated in a safe manner. The safe switch-off according to example embodiments of the present invention is also implementable as described in German Published Patent Application No. 102 06 107 or German Published Patent Application No. 102 07 834. The safe deactivation of the output stage may prevent the formation of a field of rotation. However, this also means that the brake control is without supply.

Brake control 4 includes at least one rectifier, which is supplied in a capacitive manner from the supply lines for the motor with the aid of capacitors C1, C2, C3. The unipolar voltage generated by the rectifier is able to supply the brake. The brake has a two-part arrangement as described, for example, in German Published Patent Application No. 36 13 294.

If the control electronics of the converter or its voltage supply fails, or if a corresponding failure or damage occurs, the supply of the electromotor will not function correctly. In particular, three permanent DC voltages or even zero voltages are applied at the motor. This has the result that the supply of the brake control is interrupted since no energy is transmitted via the capacitive coupling in the case of DC voltages. The solenoid coils of the brake become currentless, and the brake is activated as a result. This application is effected by the force of spring elements since the previously counteracting force of the energized solenoids is lacking.

In this manner, a safety brake is produced, which is, e.g., activated automatically and in a physically completely safe manner, and which generates brake torque as soon as the converter no longer works correctly. In fault-free functioning, AC voltages are at all times applied at the three supply lines between output stage and motor, which have a frequency in the range of more than 1 kHz, e.g., 4 kHz or 8 kHz or 16 kHz. In further exemplary embodiments according to the present invention, it is also possible to provide frequency ranges, e.g., around the mentioned frequencies. Care should be taken that these AC voltages are also applied when the motor is a synchronous motor and is regulated to a standstill by the converter. For even then the three potential or voltages values of the three lines are generated by pulse-width modulation. The potential or voltage value is the average across a pulse-width modulation period.

The illustrated DC voltages and zero voltages do not only occur in the described fault cases but also during normal operation when a regular shut-down of the motor is required, for example, also during shut-down of the converter.

In exemplary embodiments of the present invention, the brake may also have only one part, in which case only two lines lead from brake control 4 to brake 3.

In exemplary embodiments according to the present invention, the motor is to be supplied not in a three-phase, but in a two-phase manner. Accordingly fewer capacitors may be required to supply brake control 4.

In exemplary embodiments of the present invention, a reluctance motor, an asynchronous motor or a synchronous motor may be provided as electromotor.

Figure 2:
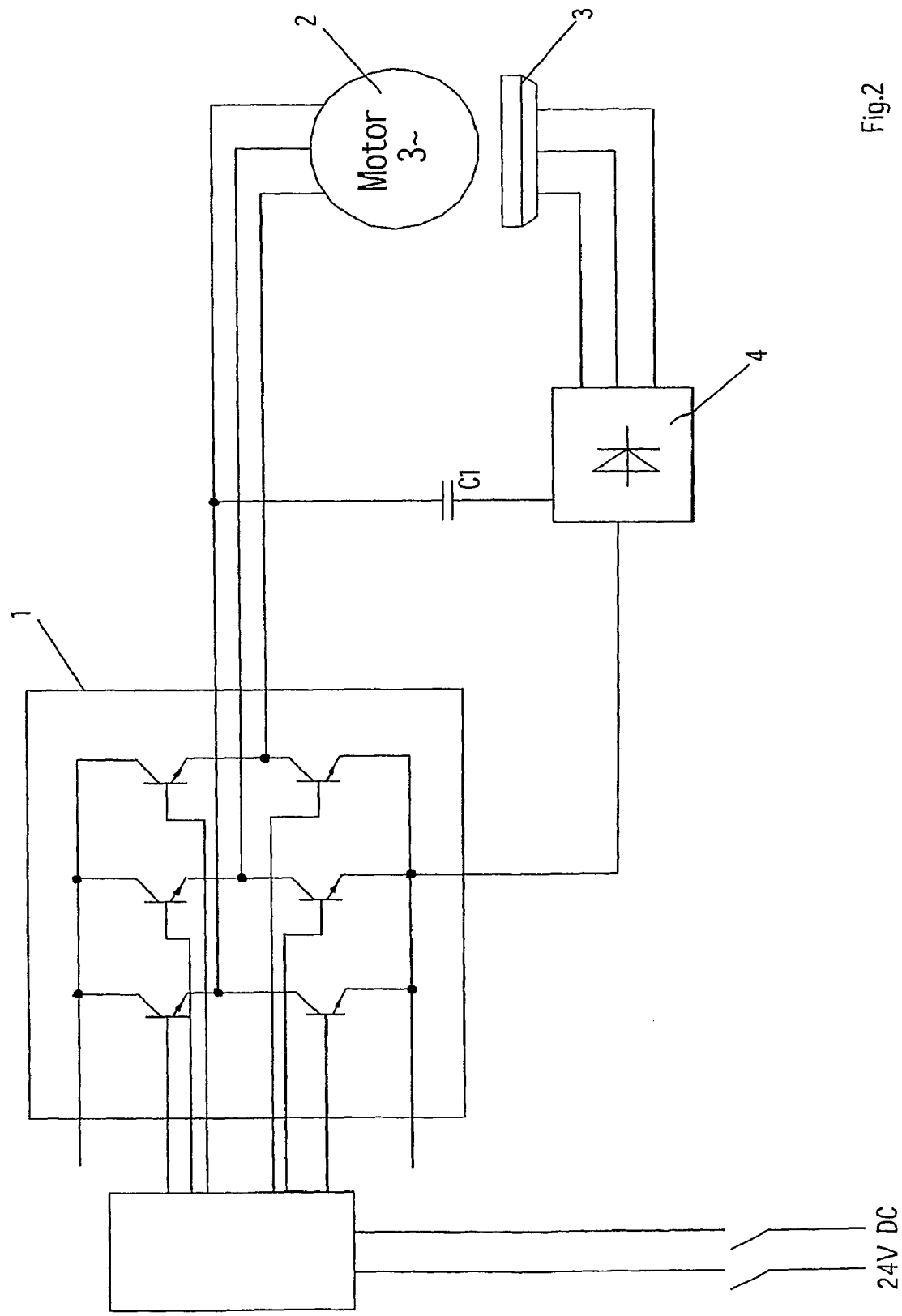
FIG. 2 illustrates a drive according to an example embodiment of the present invention.

In an exemplary embodiment of the present invention as illustrated in FIG. 2, it is also possible to provide only one capacitor C1 instead of the three capacitors C1, C2, C3. This may make it possible to use fewer parts and to reduce the cost.

Example embodiments of the present invention may be applicable in analogous manner to power converters as well.

What is claimed is:

1. A drive, comprising:
   an electromotor;
   an output stage, supply lines of the output stage connected to the electromotor; and
   a brake supplied from a brake control connected to the supply lines by at least one capacitor.

2. The drive according to claim 1, wherein the output stage includes at least one of (a) a converter, (b) an inverter and (c) a power converter.

3. The drive according to claim 1, wherein the output stage operable in a pulse-width-modulated manner.

4. The drive according to claim 1, wherein the brake is activatable in accordance with a long-lasting occurrence of at least one of (a) a DC voltage or (b) a zero voltage on the supply lines.

5. The drive according to claim 1, wherein the brake is configured to transmit brake torque to at least one of (a) a rotor shaft of the electromotor and (b) a shaft connected to the rotor shaft in accordance with a long-lasting occurrence of at least one of (a) a DC voltage or (b) a zero voltage on the supply lines.

6. The drive according to claim 1, wherein the brake is activatable in accordance with a critical minimum frequency of respective time characteristics of potentials of the supply lines being undershot.

7. The drive according to claim 1, wherein the brake is configured to transmit brake torque to at least one of (a) a rotor shaft of the electromotor and (b) a shaft connected to the rotor shaft in accordance with a critical minimum frequency of respective time characteristics of potentials of the supply lines being undershot.

8. The drive according to claim 1, wherein the brake is activatable in accordance with critical RMS values of potentials of the supply lines being undershot.

9. The drive according to claim 1, wherein the brake is configured to transmit brake torque to at least one of (a) a rotor shaft of the electromotor and (b) a shaft connected to the rotor shaft in accordance with critical RMS values of potentials of the supply lines being undershot.

10. The drive according to claim 1, wherein the brake includes a brake coil having one of (a) a one-pad and (b) a two-part configuration.

11. The drive according to claim 1, wherein the brake control is connected to the supply lines by three capacitors in a three-phase supply.

12. The drive according to claim 1, wherein the brake control is connected to the supply lines by two capacitors in a two-phase supply.

13. The drive according to claim 10, wherein the brake is electromagnetically actuable.

14. The drive according to claim 10, wherein the brake is configured to be released upon electrical supply to the brake.

15. The drive according to claim 10, wherein the brake includes a brake lining pressable against a brake surface of the electromotor to brake the electromotor.

16. The drive according to claim 10, wherein a brake lining is urgeable against a brake surface of the electramotor under a spring force when the brake is activated.

17. The drive according to claim 10, wherein the brake is configured to be activated in response to a zero voltage on the supply lines.

18. The drive according to claim 10, wherein the brake is configured to apply brake torque to at least one of (a) a rotor shaft of the electromotor and (b) a shaft connected to the rotor shaft.

19. An electromagnetically actuable brake for an electromotor, the electromotor connected to an output stage by supply lines, the brake supplied from a brake control, the brake control connected to the supply lines by at least one capacitor.

20. The brake according to claim 19, wherein the output stage includes at least one of (a) a converter, (b) an inverter and (c) a power converter.

21. The brake according to claim 19, wherein the brake is configured to be released upon electrical supply to the brake.

22. The brake according to claim 19, further comprising a brake lining pressable against a brake surface of the electromotor to brake the electromotor.

23. The brake according to claim 19, further comprising a brake lining urgeable against a brake surface of the electromotor under a spring force when the brake is activated.

24. The brake according to claim 19, wherein the brake is configured to be activated in response to a zero voltage on the supply lines.

25. The brake according to claim 19, wherein the brake is configured to apply brake torque to at least one of (a) a rotor shaft of the electromotor and (b) a shaft connected to the rotor shaft.

* * * * *